US009454886B2

(12) United States Patent
Gordon et al.

(10) Patent No.: US 9,454,886 B2
(45) Date of Patent: Sep. 27, 2016

(54) INTEGRATED CIRCUITS WITH RADIOACTIVE SOURCE MATERIAL AND RADIATION DETECTION

(71) Applicant: GLOBALFOUNDRIES INC., Grand Cayman (KY)

(72) Inventors: Michael S. Gordon, Yorktown Heights, NY (US); Kenneth P. Rodbell, Sandy Hook, CT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 719 days.

(21) Appl. No.: 14/037,550

(22) Filed: Sep. 26, 2013

(65) Prior Publication Data

US 2015/0084776 A1  Mar. 26, 2015

(51) Int. Cl.
*G08B 17/00* (2006.01)
*G08B 17/12* (2006.01)
*G01T 7/00* (2006.01)
*G08B 17/11* (2006.01)

(52) U.S. Cl.
CPC ............... *G08B 17/12* (2013.01); *G01T 7/00* (2013.01); *G08B 17/11* (2013.01)

(58) Field of Classification Search
CPC ............ G01V 5/0008; G01V 5/0016; G01V 5/0066; A61B 5/0037; A61B 5/0077; A61B 5/1079; A61B 6/037; A61B 6/0407; A61B 6/4258; A61B 6/4417; A61B 6/461; A61B 6/5205; A61B 6/545; A61B 8/08
See application file for complete search history.

(56) References Cited

U.S. PATENT DOCUMENTS

| | | | |
|---|---|---|---|
| 5,760,394 A | * | 6/1998 | Welle .................. G01N 33/2882 250/303 |
| 6,645,789 B2 | | 11/2003 | Bernstein et al. |
| 7,084,660 B1 | | 8/2006 | Ackaret et al. |
| 7,238,547 B2 | | 7/2007 | Zabel et al. |
| 7,489,596 B2 | | 2/2009 | Kuczynski et al. |
| 7,649,257 B2 | | 1/2010 | Gordon et al. |
| 8,120,131 B2 | | 2/2012 | Cannon et al. |
| 8,211,538 B2 | | 7/2012 | Heffner |
| 8,212,218 B2 | | 7/2012 | Cabral, Jr. et al. |

(Continued)

OTHER PUBLICATIONS

Liying et al., "The Application of Stolen Radioactive Source Tracking System Based on Internet of Things Technology", 2011 Third International Conference on Measuring Technology and Mechatronics Automation, (ICMTMA) (vol. 3), Jan. 6-7, 2011, Shangshai, pp. 696-698, DOI: 10.1109/ICMTMA.2011.746, Copyright 2011 IEEE, <http://ieeexplore.ieee.org/xpl/login.jsp?tp=&arnumber=5721583&url=http://ieeexplore.ieee.org/stamp/stamp.jsp?tp=&arnumber=5721583>.
"Chip Scale Review", <www.ChipScaleReview.com>, Oct.-Nov. 2009, pp. 1-40.
"Measurement and Reporting of Alpha Particle and Terrestrial Cosmic Ray-Induced Soft Errors in Semiconductor Devices", JEDEC Standard, JESD89A (Revision of JESD89, Aug. 2001), Oct. 2006, pp. 1-94.

(Continued)

*Primary Examiner* — Kerri McNally
*Assistant Examiner* — Renee Dorsey
(74) *Attorney, Agent, or Firm* — Scully Scott Murphy and Presser; Frank Digiglio

(57) ABSTRACT

Radioactive integrated circuit (IC) devices with radioactive material embedded in the substrate of the IC itself, and including logic for "fingerprinting" (that is, determining characteristics that identify the source of the radioactive source material). Radioactive IC devices with embedded detector hardware that determine aspects of radioactivity such as total dose and/or ambient radiation. Radioactive IC devices that can determine an elapsed time based on radioactive decay rates. Radioactive smoke detector using manmade, relatively short half-life radioactive source material.

6 Claims, 1 Drawing Sheet

(56) References Cited

U.S. PATENT DOCUMENTS

| | | |
|---|---|---|
| 8,288,177 B2 | 10/2012 | Gaynes et al. |
| 8,361,829 B1 | 1/2013 | Gordon et al. |
| 2008/0258057 A1 | 10/2008 | Williamson et al. |
| 2009/0065955 A1 | 3/2009 | Gordon et al. |
| 2011/0220805 A1 | 9/2011 | Gordon et al. |
| 2012/0146798 A1 | 6/2012 | Dziekan et al. |
| 2015/0078518 A1* | 3/2015 | Tziazas .................. G06T 7/001 378/53 |

OTHER PUBLICATIONS

"Smoke Detector (1970s)", Last updated: Jan. 20, 2009, Copyright 1999, Oak Ridge Associated Universities, <http://www.orau.org/ptp/collection/consumer products/smokedetector.htm>.

"Smoke Detectors & Radiation / Radiation Protection / US EPA", <http://www.epa.gov/radiation/sources/smoke_alarm.html>, Last updated on Wednesday, Jun. 27, 2012.

* cited by examiner

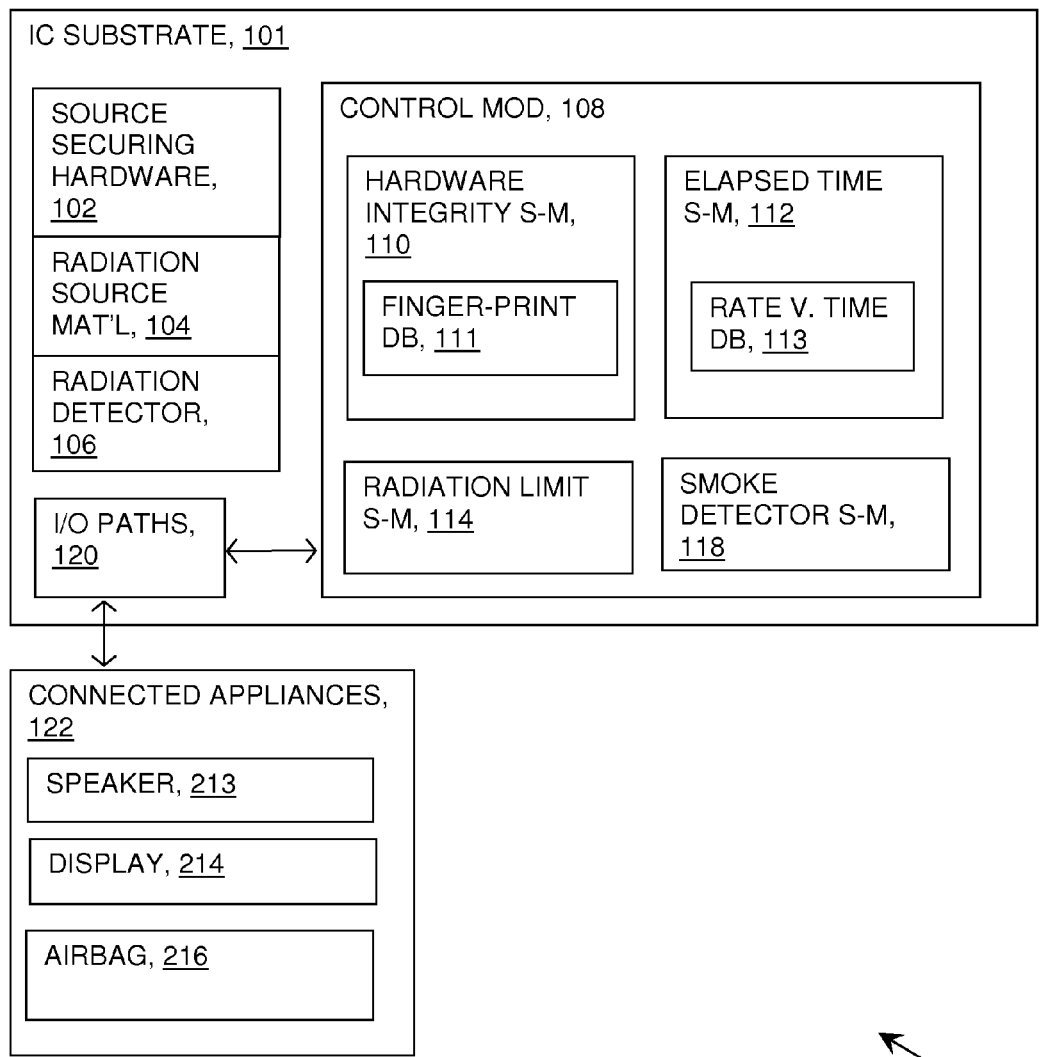

INTEGRATED CIRCUITS WITH RADIOACTIVE SOURCE MATERIAL AND RADIATION DETECTION

FIELD OF THE INVENTION

The present invention relates generally to the field of electronic circuit devices which include radioactive detectors and/or radioactive sources which are in "radioactive communication" (see definition, below, in definitions subsection of the Detailed Description section) with the electronic circuitry.

BACKGROUND OF THE INVENTION

Artificially created radioactive isotopes are created when some nuclei of isotopes that are not naturally radioactive are bombarded with certain high-energy particles. Each radioactive isotope is characterized by a half-life value, which relates to the manner in which the radioactive material becomes less radioactive over time, and activity, usually measured in Curies (Ci), or in units of Becquerel (Bq). One Ci unit equals $3.7 \times 10^{10}$ disintegrations per second. One Bq unit equals 1 disintegration per second. More specifically, the half-life is the average length of time it takes for half of the nuclei in a portion of a radioactive material to decay. Some points of comparison/contrast between artificially created radioactive isotopes and natural radioactive isotopes are as follows: (i) both natural and artificial radioactive materials "decay" according to half-life values; and (ii) artificial radioactive isotopes generally have short half-life period values relative to natural radioactive isotopes.

There are conventional devices in the form of an integrated circuit chip (IC) with radioactive material mechanically connected to be in "radioactive communication" with the circuitry of the IC. In this document, a device where the radioactive source material is in radioactive communication with the circuitry will sometimes herein be described as having an "embedded source". There are conventional devices in the form of an IC with radioactivity detectors (herein sometimes called "radiation detectors", which should not be confused with, say, visible light detectors) in data communication within the IC. In this document, a device where the radioactive detector is in data communication with the circuitry will sometimes herein be described as having an "embedded detector".

SUMMARY

According to an aspect of the present invention, there is a method, and associated hardware, for identifying circuitry. The method includes the following steps (not necessarily in the following order): (i) providing a device including a circuitry hardware set and a radioactive source, with the radioactive source mechanically connected to the circuitry hardware set and with the radioactive source having a predetermined radioactivity fingerprint having a set of radioactivity fingerprint characteristics including at least a first radioactivity fingerprint characteristic; (ii) detecting at least some radioactivity fingerprint characteristic(s) based on radiation emitted by the radioactive source; and (iii) identifying at least a first identification characteristic of the circuitry hardware set based, at least in part, upon the detected radioactivity fingerprint characteristic(s).

According to a further aspect of the present invention, an integrated circuitry apparatus includes: an integrated circuit chip; a radioactive source; a connection hardware set; and a radiation detection module. The radioactive source is mechanically connected to the integrated circuit chip by the connection hardware set. The radiation detection module is operatively connected to the integrated circuit chip so that the radiation detection module is in radioactive communication with the radioactive source. The radiation detection module is structured, located, programmed and/or connected to determine at least one of the following: (i) a total dose of radiation taken over time from the radioactive source and external radiation source(s) considered in the aggregate, and/or (ii) a total amount of radiation from the radioactive source and external radiation source(s) considered in the aggregate for a given point in time.

According to a further aspect of the present invention, an apparatus for detecting smoke includes: a radioactive source; a radiation detector; and a smoke alarm module. The radioactive source is in radioactive communication with the radiation detector. The radiation detector sends a detection signal to the smoke detector module, with the detection signal being based, at least in part, upon radiation emitted from the radioactive source. The smoke detector module is connected, structured and/or programmed to send out an alarm signal on condition that the detection signal indicates the presence of smoke. The radioactive source is an artificially created radioactive isotope having a half-life less than 432 years.

BRIEF DESCRIPTION OF THE SEVERAL VIEWS OF THE DRAWINGS

FIG. 1 is a block diagram of an embodiment of an exemplary multi-purpose apparatus according to the present invention.

DETAILED DESCRIPTION

FIG. 1 is a block diagram illustrating apparatus 100, including: IC substrate 101; source securing hardware 102; radioactivity source material (also sometimes herein called radiation source material) 104; radiation detector 106; control module ("mod") 108; hardware integrity sub-module 110 (including fingerprint database 111); elapsed time sub-module 112 (including rate versus time database 113); radiation limits sub-module 114; smoke detector sub-module 118; input/output (I/O) paths 120; and connected appliance set 122 (including speaker 213, display 214, and airbag 216). To describe apparatus 100 in very general terms: (i) source securing hardware 102 mechanically secures radiation source material 104; (ii) detector 106 detects radiation given off by source 104 and sends this information to control module 108; (iii) control module 108 has hardware, software and/or firmware to perform various logic functions, with some of the logic functions using the detected radiation as an input; and (iv) connected appliance set 122 has various appliances that are controlled, at least in part, by control mod 108 (for example, speaker 213 is controlled by control mod 108 to act as a smoke alarm).

It should be kept in mind that apparatus 100 is an exemplary, multi-purpose device that is discussed to illustrate many aspects of the present invention—many commercial-product-oriented embodiments of the present disclosure have only some sub-set of the novel features and characteristics of exemplary apparatus 100.

Source securing hardware 102 mechanically connects (see definition, below) source material 104 to IC substrate 101 so that radioactive source material 104 is in radioactive communication with the circuitry (specifically radiation detector 106). In this embodiment, the source material is a layer of the substrate itself, embedded in the other layers of the laminate-form IC substrate, and the source securing hardware is the other layers of the IC substrate that embed and secure the radioactive source layer. Alternatively, the securing hardware may secure the source material in ways including, but not limited to: (i) spread across an outer surface of the substrate (for example, as radioactive underfill); (ii) as a particle encased within the IC substrate material; (iii) as a particle mounted on, or near, an outer surface of the IC substrate; (iv) in the form of a mesh or trace (or thin layer on a mesh or trace) in the IC substrate; and/or (v) other locations and/or geometries on, in and/or near the IC substrate.

In this embodiment, radioactive source material 104 is a layer that may include a mix of radioactive isotopes, along with other materials, such as binders. In this embodiment, the radioactive isotopes that make up radioactive source 104 may be naturally occurring or man-made and have a "relatively short half life" (that is, less than 432 years). Alternatively, radioactive source material in various embodiments of the present disclosure could be: (i) exclusively formed of a single radioactive isotope; (ii) formed from a single radioactive isotope mixed with other non-radioactive materials such as binders; (iii) man-made radioactive isotope(s); (iv) naturally-occurring radioactive isotope(s); and/or (v) mixtures of man-made and naturally-occurring isotopes (with or without non-radioactive materials in the mix). When the sub-modules of control mod 108 are discussed below, there will be some more detailed discussion of which kinds of radioactive source materials work best in various embodiments of the present disclosure. Some embodiments of the present disclosure may not even require a radiation source to be present in the apparatus.

A radioactive source produces radiation by radioactive decay. The radioactive source may be described by characteristics including: (i) type of radiation emitted such as: (a) alpha particles, (b) beta particles, (c) neutrons, (d) x-rays, and/or (e) gamma; (ii) corresponding half-life; and (iii) corresponding activity. The alpha particles are the least penetrating of the radiation types. The most penetrating are the neutral particles, which include: (i) neutrons; (ii) x-rays; and (iii) gamma rays. The half-life is the amount of time for half of the isotope atoms in a given sample to undergo decay. In general, naturally-occurring radioactive isotopes with long half-lives do not have very high levels of radioactivity. Artificially created radioactive isotopes can be made with varying intensity, or activity, to suit the application and can have relatively short half-lives. For a single radioactive source including multiple kinds of radioactive isotopes, respectively having different half lives: sometimes it will be possible to track the decay of a single constituent isotope, individually, based on the type of radiation emitted the intensity and the corresponding energy of the radiation emitted.

Some embodiments of the present disclosure include a radiation source, of single or multiple isotopes, having a certified initial level of radioactivity. Some embodiments of the present disclosure embed the radiation source into or next to chips or circuits.

Radiation detector 106 will now be discussed. In this embodiment, the radiation detector is an "embedded radiation detector". Some embodiments of the present invention may not require a radiation detector to be present in the apparatus.

The various sub-modules of control module will now be discussed, starting with hardware integrity sub-module 110 and its "fingerprint" database 111. More specifically, some embodiments of the present invention include radioactive source material in and/or on an IC assembly so that the pattern of radiation (or "fingerprint") emitted from the source material serves as a way to identify the maker of the IC assembly and/or to show that the IC assembly is not counterfeit. The fingerprint might include: radiation type, intensity, intensity change taken over a time interval, momentum of emitted radiation, and/or energy distribution. Fingerprint database 111 includes the pattern information associated with one or more IC makers. Sub-mod 110 provides the logic to determine whether the radiation, detected by detector 106, meets at least one of the patterns respectively associated with an authorized and qualified foundry. If the pattern detected by detector 106 and analyzed by sub-mod 110 is not from a trusted foundry, then sub-mod 110 may be structured and/or programmed to take various actions, such as disabling the IC and/or alerting the user of the IC. As an alternative, the detector and/or the logic for analyzing the radiation emitted by the IC may not be included in or on the IC and/or the apparatus in which the IC is present.

In some embodiments of the present invention, external radiation detectors could be used for detecting neutral radiation sources, such as x-rays or gamma-rays, to determine which chips or circuits from a batch had the appropriate type and intensity of radiation. The external radiation detector could be: (i) an ionization detector (handheld or otherwise); (ii) a Geiger counter; or (iii) other detector depending on: (i) the radioactive source activity; (ii) radiation type; and (iii) energy.

For alpha-particle radiation sources, the radiation detector could be embedded into the circuit, due to the short range of the alpha-particles. One advantage to using alpha-particle radiation is that it does not pose a safety hazard since the radiation would not typically reach outside of the package. The internal detector could be a micro-Geiger counter or even a single-event-upset-based (SEU) detector (such as static random access memory (SRAM), where the number of single event upsets is proportional to the amount of radiation detected).

To explain in more detail, some embodiments of the present invention include radioactive source material (of single or multiple isotopes) of certified initial levels of radioactivity built in the chips or circuits. With these embodiments, internal or external detectors determine which chips or circuits from a batch had the appropriate type and intensity of radiation (that is, "radiation fingerprint"). Chips or circuits from non-trusted foundries, or counterfeit parts, would not have the correct radiation fingerprint and even if there was an embedded radioactive source of some type in the counterfeit chip/circuit. The details of the radiation fingerprint (type, flux, etc.) would almost certainly be different than those used by the trusted foundry.

Some embodiments of the present disclosure have useful applications where determining the origin of replacement parts is important, such as in the airline, aerospace, and auto industries. Further usefulness may be had in areas that require authentication that certified replacement parts are indeed installed.

To summarize, sub-mod 110 determines one or more "identification characteristics" of the IC based on the radioactivity fingerprint. Some possible identification characteristics include: authenticity of the circuitry, manufacturing location of the circuitry, manufacturing entity of the circuitry, date of manufacture of the circuitry, designated customer for the circuitry, model/revision of the circuitry, warranty policy associated with the circuitry, a serial number which is unique on a per circuit basis, port mapping for the circuitry, identification of software, hardware and/or firmware authorized to be used with the circuitry and/or intended geographic market for the circuitry. In the embodiments where date of manufacture of the circuitry is determined based on the radioactivity fingerprint, this date identification is achieved by having the circuitry manufacturer use radioactive sources having different fingerprints at different times (for example, one fingerprint for August 2013 IC builds and another fingerprint for September 2013 IC builds). This is different than using the radioactive source to do elapsed time measurement by measuring radioactivity from the source at various times, as will be discussed, below, in connection with elapsed time sub-mod 112.

Elapsed time sub-module 112 will now be discussed. In this embodiment, sub-mod 112 determines an elapsed time between a current measurement and an initial measurement of the radiation level emitted by the source material based on input from detector 106. This could be useful in applications including, but not limited to, the following: (i) to know the time since a backup battery was replaced (for example, the battery in a smoke detector); and (ii) to know the age of a critical component (for example, age of a car battery). It is noted that embodiments, according to the measurement-of-time aspect of the present invention, do not necessarily require a radiation detector.

An explanation of the scientific principles and mathematical equations associated with determining elapsed time follows.

The intensity of the radiation is governed by the exponential decay formula:

$$I = I_0 e^{-\lambda t}$$

where the initial activity, $I_0$, and the activity, I, at time t are shown. The decay constant, $\lambda$, is related to the half-life, $T_{1/2}$, according to the following formula:

$$\lambda = \frac{\ln 2}{T_{1/2}}$$

Given the decay constant, $\lambda$, one is able to compute the elapsed time between two measurements of the radiation level, or radioactivity, by solving the exponential decay formula at time, t, as follows:

$$t = \frac{1}{\lambda} \ln \frac{I_0}{I}$$

Radiation limit sub-module 114 will now be discussed. In this embodiment, sub-mod 114 calculates two limits based upon input from detector 106: (i) an ambient radiation limit; and (ii) a total dose radiation limit. With respect to these radiation limits, in the case of an internal, embedded detector, the chip or circuit could be disabled (or sound an alarm, or show a warning) if sub-mod 114 determines the presence of additional radiation, from an external x-ray, gamma-ray, electron beam probe, or the like. The external radiation that is detected may or may not be caused by radioactive decay. Sub-mod 114 also determines (based on input from internal, embedded detector 106) the total radioactivity dose that apparatus 100 has been exposed to, from both the internal source and any external radiation (either intentional or unintentional). One example of this application is an ionization smoke detector, discussed further below. It is noted that embodiments according to the radiation-limits aspect of the present invention, do not necessarily require a radiation source.

Smoke detector sub-module 118 will now be discussed. Another application of the use of radiation sources and circuits would be to change the typically-used radioactive source in smoke detectors from $^{241}$Am, which has a half-life of 432 years, to a radioactive source that has a much shorter half-life. Most of the old smoke detectors currently in use will end up in landfills well before the radiation levels die off which could pose an environmental hazard. Smoke detector circuits detect the change in ionization when smoke enters the ionization chamber. In these embodiments, the ionization detector should be sufficiently "smart", so that it can operate effectively in an environment where radioactivity received from the radioactive source diminishes over time.

In some embodiments of the present disclosure, radiation limit sub-module 114 and smoke detector sub-module 118 operate together. The radiation limits sub-mod detects the reduction of ionization commensurate with the reduction in radiation from the radiation source in the absence of smoke. In that way, the ionization detector is able to adjust according to the detected reduction in radioactive source activity. Alternatively, when the voltage drops below a designated value, smoke detector sub-module 118 takes the responsive action to sound a voice alarm through speaker 213 to signal the end of the usable life of the smoke detector, saying, for example, "replace radiation source". Alternatively, replacement of the smoke detector may be indicated by an audible alarm. Alternatively, there is no audible alarm, but a visual alarm is displayed through display 214. However, in these kinds of embodiments, the system designer should take care to make the logic of sub-mod 118 intelligent enough to distinguish phenomena caused by a diminishing radioactive source from other phenomena like used-up batteries, loose batteries, smoke, etc.

I/O paths 120 carry control signals between the various sub-modules of control mod 108 and the connected appliance set 122. In this embodiment, these I/O paths are electrical signal communication paths, but they could be, or include, other types of data communication connections (see definition, below), such as wireless transmission paths conventionally used by smart phones and/or computers. In this embodiment, the detector, the control mod, the I/O paths and the connected appliances all require electrical power, which is supplied by a power sub-system which is conventional and, therefore, not shown in FIG. 1.

Speaker 213 receives various analog audio signals from control mod 108 and transduces these analog signals into sound waves. In this way, different types of alarms, or informational narrative, can be sounded for conditions such as the following: (i) fingerprinting related information; (ii) total dose and/or ambient radiation alarms; (iii) elapsed time-related information (such as a need-new-airbag warning); and (iv) smoke alarm.

Display 214 receives various image and/or video signals from control mod 108 and generates video and/or image displays according to these signals. In this way, different types of displays can be displayed for conditions such as the following: (i) fingerprinting related information; (ii) total dose and/or ambient radiation visual alarm; (iii) elapsed time-related information (such as a need-new-airbag warning); and (iv) smoke visual alarm.

Airbag 216 for a vehicle (not shown) is an example of an appliance that is not directly controlled in its operation by the output of the radiation detector, but, rather, uses the detected radiation to perform a function that is ancillary to its primary function. In this case, the ancillary function performed by the detected radiation is that it helps determine when the airbag should be replaced and/or checked.

Some definitions will now be set forth in the following paragraphs.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention", is tentative and provisional and subject to change over the course of patent prosecution as relevant information is developed and as the claims are potentially amended.

Embodiment: see definition of "present invention" above—similar cautions apply to the term "embodiment".

and/or: non-exclusive or; for example, A and/or B means that: (i) A is true and B is false; or (ii) A is false and B is true; or (iii) A and B are both true.

Electrically Connected: means either directly electrically connected, or indirectly electrically connected, such that intervening elements are present; in an indirect electrical connection, the intervening elements may include inductors and/or transformers.

Mechanically connected: includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine-readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Radioactive communication: when an object is located and/or mechanically connected to predictably and reliably receive radioactivity from a radioactive source, then the object is in "radioactive communication" with the source.

What is claimed is:

1. A method of identifying circuitry, the method comprising:
providing a device including a circuitry hardware set and a radioactive source, with the radioactive source mechanically connected to the circuitry hardware set and with the radioactive source having a predetermined radioactivity fingerprint having a set of radioactivity fingerprint characteristics including at least a first radioactivity fingerprint characteristic;
detecting at least some radioactivity fingerprint characteristic(s) based on radiation emitted by the radioactive source; and
identifying at least a first identification characteristic of the circuitry hardware set based, at least in part, upon the detected radioactivity fingerprint characteristic(s).

2. The method of claim 1 wherein the first identification characteristic is one of the following: authenticity of the circuitry, manufacturing location of the circuitry, manufacturing entity of the circuitry, date of manufacture of the circuitry, designated customer for the circuitry, model/revision of the circuitry, warranty policy associated with the circuitry, a serial number which is unique on a per circuit basis, port mapping for the circuitry, identification of software, hardware and/or firmware authorized to be used with the circuitry and/or intended geographic market for the circuitry.

3. The method of claim 1 wherein the circuitry hardware set is in the form of an integrated circuit.

4. The method of claim 1 wherein the detected radioactivity fingerprint characteristic(s) includes at least one of the following: radiation type, intensity, intensity change taken over a time interval, momentum of emitted radiation, and/or energy distribution.

5. The method of claim 1 wherein the radioactive source includes multiple different radioactive isotopes.

6. The method of claim 1 wherein the radioactive source is permanently mechanically connected to the circuitry hardware set such that the circuitry hardware set cannot be separated from the radioactive source without destroying at least one of the following: the radioactive source and/or the circuitry hardware set.

* * * * *